(12) United States Patent
Hankins et al.

(10) Patent No.: US 9,351,152 B2
(45) Date of Patent: May 24, 2016

(54) AUTOMATICALLY QUIETING MOBILE DEVICES

(71) Applicant: FUJITSU LIMITED, Kawasaki-shi, Kanagawa (JP)

(72) Inventors: Linh Hankins, Milpitas, CA (US); Matthew Depetro, Sunnyvale, CA (US); Jane Yin, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/520,173

(22) Filed: Oct. 21, 2014

(65) Prior Publication Data

US 2016/0112866 A1    Apr. 21, 2016

(51) Int. Cl.
*H04W 24/00*    (2009.01)
*H04W 8/22*     (2009.01)
*H04W 4/02*     (2009.01)

(52) U.S. Cl.
CPC . *H04W 8/22* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 8,195,198 B1* | 6/2012 | Shaw | | H04W 48/04 455/456.1 |
| 2005/0075096 A1 | 4/2005 | Aljuraid | | |
| 2005/0170849 A1* | 8/2005 | McClelland | | H04W 48/04 455/456.4 |
| 2005/0186977 A1* | 8/2005 | Chiu | | H04W 8/18 455/466 |
| 2008/0096518 A1* | 4/2008 | Mock | | H04W 48/04 455/404.1 |
| 2008/0125140 A1* | 5/2008 | Udani | | H04M 1/72572 455/456.1 |
| 2009/0061781 A1* | 3/2009 | Zhang | | H04W 52/0258 455/66.1 |
| 2009/0170532 A1 | 7/2009 | Lee et al. | | |
| 2009/0298511 A1 | 12/2009 | Paulson | | |
| 2009/0325566 A1* | 12/2009 | Bell | | H04W 8/22 455/419 |
| 2012/0309450 A1* | 12/2012 | Jiang | | H04W 48/02 455/550.1 |
| 2013/0051378 A1* | 2/2013 | Gruberman | | H04W 8/245 370/338 |
| 2013/0225152 A1* | 8/2013 | Matthews, III | | H04W 8/24 455/419 |
| 2013/0304825 A1* | 11/2013 | O'Neill | | H04L 51/00 709/206 |
| 2014/0045449 A1* | 2/2014 | Cook | | H04M 1/72577 455/404.1 |
| 2014/0122396 A1* | 5/2014 | Swaminathan | | G06N 99/005 706/14 |

(Continued)

FOREIGN PATENT DOCUMENTS

WO    2013/184530 A1    4/2005

OTHER PUBLICATIONS

"How to use Motorola Assist on Moto G?" http://allaboutmotog.com/how-to-use-motorola-assist-on-moto-g/, retrieved O on Oct. 21, 2014.

(Continued)

*Primary Examiner* — Kimberly A Williams
(74) *Attorney, Agent, or Firm* — Maschoff Brennan

(57) ABSTRACT

A method may include receiving one or more of calendar data, user location data and third-party location data. The calendar data may include activity instructions that indicate that a mobile device be in a quiet mode during a particular activity included in the calendar data. The user location data may include user location instructions that indicate that the mobile device be in the quiet mode when the mobile device is at a particular location based on the particular location being of a particular location type. The third-party location data may include external request instructions that indicate that the mobile device be in the quiet mode when the mobile device is at a third-party location. The method may also include placing the mobile device in the quiet mode based on one or more of the activity instructions, the user location instructions and the external request instructions.

18 Claims, 4 Drawing Sheets

(56) References Cited

U.S. PATENT DOCUMENTS

2015/0079962 A1* 3/2015 Baker .................. H04W 8/18
 455/418
2015/0085725 A1* 3/2015 Estevez ............. H04W 52/0206
 370/311

OTHER PUBLICATIONS

"Silent Location" Pzycoderz—Jun. 10, 2013.
Extended European Search Report for corresponding EP Application No. 15165884.6, mailed Feb. 22, 2016.

* cited by examiner

*Fig. 1B*

| Appointment | | |
|---|---|---|
| Subject: | | |
| Location: | | |
| Start Time: | Date | Time |
| End Time: | Date | Time |

| Quiet Mobile Device: | Select Registered Mobile Device(s) |
|---|---|

AUTOMATICALLY QUIETING MOBILE DEVICES

FIELD

The embodiments discussed herein are related to automatically quieting mobile devices.

BACKGROUND

Mobile devices are increasingly ubiquitous and part of everyday life. Mobile devices provide notifications to users for all manner of things such as incoming phone calls, received text messages, received emails, meeting reminders, task reminders, etc. A common way to provide the notifications is through sound output by the mobile devices. However, at times, sound-based notifications may be inappropriate, undesired, or rude. Instances of when sound-based notifications may be inappropriate may include when a user is attending meetings, attending church, at a restaurant, at the movie theatre, at the library, at a live performance, at a bookstore, etc. Often users forget to turn off sound-based notifications on their mobile devices when a sound-based notification is inappropriate or undesired such that their mobile devices may provide a sound-based notification at an inappropriate or undesired time.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include receiving one or more of calendar data, user location data and third-party location data. The calendar data may include activity instructions that indicate that a mobile device be in a quiet mode during a particular activity included in the calendar data and the activity instructions may be from a user of the mobile device. The user location data may include user location instructions that indicate that the mobile device be in the quiet mode when the mobile device is at a particular location based on the particular location being of a particular location type. The user location instructions may be from the user of the mobile device. The third-party location data may include external request instructions that indicate that the mobile device be in the quiet mode when the mobile device is at a third-party location. The external request instructions may be from a third party that manages the third-party location. The method may also include placing the mobile device in the quiet mode based on one or more of the activity instructions, the user location instructions and the external request instructions.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1B illustrates an example screen of a calendar application;

DESCRIPTION OF EMBODIMENTS

Some embodiments described herein relate to methods and systems of placing a mobile device into a "quiet mode" based on a user's location and/or activities. The quiet mode may be a mode of the mobile device in which sound-based notifications may be disabled. For example, when a mobile device is in quiet mode, the mobile device may provide visual and/or vibrating notifications, but sound-based notifications may be disabled. In some embodiments, the mobile device may be configured to prompt the user to execute a command to put the mobile device in quiet mode and/or to automatically place itself in quiet mode based on calendar data, user location data, and/or third-party location data. The calendar data, the user location data, and/or the third-party location data may indicate a desire that the mobile device be in quiet mode at a particular time and/or place. In these or other embodiments, the mobile device may be configured to automatically place itself in quiet mode at a particular time and/or place based on the calendar data, the user location data, and/or the third-party location data. In some embodiments, the mobile device may be configured to also place itself in a non-quiet mode when the particular time has passed and/or when the mobile device is no longer at the particular place.

Embodiments of the present disclosure will be explained with reference to the accompanying drawings.

Figure 1A:
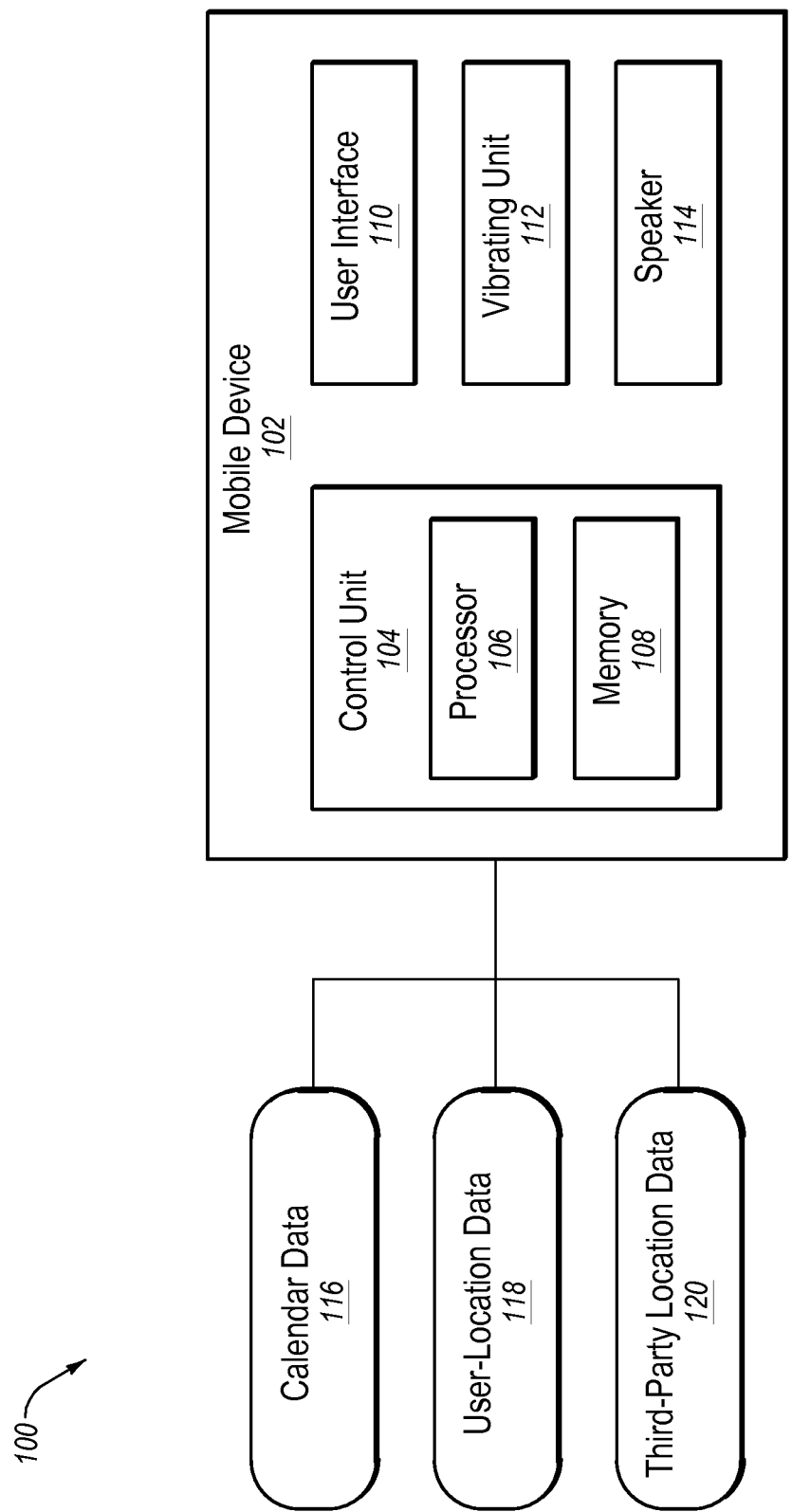
FIG. 1A is a diagram representing an example system including a mobile device that is configured to be placed in a quiet mode.

FIG. 1A is a diagram representing an example system 100 including a mobile device 102 that is configured to be placed in quiet mode based on one or more of calendar data 116, user location data 118, and third-party location data 120, according to at least one embodiment described herein. The mobile device 102 may include any device that may be carried by a user and that may provide sound based notifications. For example, the mobile device 102 may be a cellular phone, a smartphone, a personal data assistant (PDA), a tablet computer, or any other similar device. The mobile device 102 may include a control unit 104, a user interface 110, a vibrating unit 112 and a speaker 114.

The user interface 110 may include any suitable system, apparatus, or device configured to interface with a user of the mobile device. For example, the user interface 110 may include a display configured to display images and/or text that may be viewed by a user. Additionally, the user interface 110 may be configured to receive input from the user. For example, the user interface 110 may include one or more buttons configured to allow the user to direct various functions of the mobile device 102. In these or other embodiments, a screen used to display images and/or text to the user may be a touchscreen such that the user may provide input to the mobile device 102 via the touchscreen.

The vibrating unit 112 may include any suitable system, apparatus, or device configured to cause at least a portion of the mobile device 102 to vibrate. The speaker 114 may include any suitable system, apparatus, or device, configured to emit sound.

The control unit 104 may be configured to manage and/or direct one or more operations of the mobile device 102 and one or more of its components. For example, the control unit 104 may be configured to direct that images and/or text be displayed on the screen of the user interface 110; the control unit 104 may be configured to direct the vibrating unit 112 to vibrate; and/or the control unit 104 may be configured to direct that sound be emitted by the speaker 114. In these or other embodiments, the control unit 104 may be configured to direct one or more operations of the mobile device 102 in response to one or more commands that may be received from the user via the user interface. In some embodiments, the control unit 104 may include a processor 106 communicatively coupled to a memory 108.

The processor 106 may be any suitable special-purpose or general-purpose computer, computing entity, or processing device that may include various computer hardware or software modules and that may be configured to execute instructions stored on any applicable computer-readable storage media. For example, the processor 106 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1A, it is understood that the processor 106 may include any number of processors configured to perform any number of operations. In some embodiments, the processor 106 may interpret and/or execute program instructions and/or process data stored in the memory 108.

The memory 108 may include computer-readable storage media for carrying or having computer-executable instructions or data structures stored thereon. Such computer-readable storage media may be any available media that may be accessed by a general-purpose or special-purpose computer, such as the processor 106. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable storage media. Computer-executable instructions may include, for example, instructions and data configured to cause the processor 106 to perform a certain function or group of functions.

As explained below, the control unit 104 may be configured to receive and store the calendar data 116, the user location data 118, and/or the third-party location data 120. Further, the control unit 104 may be configured to perform one or more operations with respect to placing the mobile device 102 in the quiet mode based on the calendar data 116, the user location data 118, and/or the third-party location data 120.

The calendar data 116 may include information regarding one or more activities of the user of the mobile device 102. For example, the calendar data 116 may include information regarding appointments, meetings, parties, social events, etc. In some embodiments, the calendar data 116 may include activity instructions that may be provided by the user of the mobile device 102. The activity instructions may indicate that the user desires that the mobile device 102 be in the quiet mode during a particular activity included in the calendar data.

In some embodiments, the user may specify that the mobile device 102 be in the quiet mode during the particular activity by selecting that the mobile device 102 be in the quiet mode during the particular activity. In these or other embodiments, the user may specify that the mobile device 102 be in the quiet mode during activities of a particular type. Therefore, if the particular activity is of the particular type, the activity instructions may indicate that the mobile device be in the quiet mode during the particular activity based on the particular activity being of the particular type. In some embodiments, the user may indicate that the particular activity is of the particular type. In these and other embodiments, the mobile device 102 or some other service may determine that the particular activity is of the particular type without the user explicitly indicating such.

In some embodiments, a calendar application associated with the mobile device 102 may allow for the user to specify a desire as to whether or not the mobile device 102 be in the quiet mode during the specific activity or specific activity type. The calendar application may be included on the mobile device 102 and/or may be included on another device, but may be used to manage a calendar that may be synced with the mobile device 102.

FIG. 1B illustrates an example screen 124 of a calendar application that may allow a user to specify a desire as to whether or not the mobile device 102 be in the quiet mode during a specific activity, according to at least one embodiment described herein. The screen 124 may include fields that allow the user to input information regarding the specific activity such that the specific activity and its associated information may be included in a corresponding calendar and with corresponding calendar data. One of the fields may be a "Quiet Mobile Device" field 126. The "Quiet Mobile Device" field 126 may allow the user to select an identifier (e.g., phone number, device name, user defined nickname, etc.) associated with one or more mobile devices (e.g., the mobile device 102) that may be managed by the user. Therefore, the user may indicate a desire that the mobile device 102 and/or other mobile devices be in the quiet mode during the particular activity.

Although not explicitly illustrated in the screen 124, the calendar application may include another screen and/or other fields that may allow the user to register one or more mobile devices and their associated identifiers. Therefore, the user may be able to specify, e.g., via the "Quiet Mobile Device" field 126, a desire that more than one mobile device be in the quiet mode during the particular activity.

Additionally, although not explicitly illustrated in the screen 124, the calendar application may include another screen and/or other fields that may allow the user to specify activity types during which the user may desire that the mobile device 102 be in the quiet mode or not in the quiet mode. For example, the user may indicate in an "activity type" screen or field a desire that the mobile device 102 be in the quiet mode during work meetings but that the mobile device 102 not be placed in the quiet mode during doctor's appointments. In some embodiments, the activity types that may be selected or used may be default activity types and/or the user may be able to customize different activity types.

In these or other embodiments, the screen 124 may include a field that allows the user to select the activity type for the particular activity. In these or other embodiments, the calendar application may determine and select an activity type based on information populated and associated with the specific activity. When the selected activity type is associated with an activity type during which the user has indicated a desire that the mobile device 102 be in the quiet mode, the activity data associated with the specific activity and included in the calendar data may indicate such.

Returning to FIG. 1A, the control unit 104 may obtain the calendar data 116 and may determine one or more specified activities during which the user has indicated a desire that the mobile device 102 be in quiet mode. The control unit 104 may make the determination based on the activity data associated with the activities and included in the calendar data 116.

In some embodiments, when or shortly before the specified activities begin, the control unit 104 may notify the user (e.g., via the user interface 110) that the specified activities are about to begin and may prompt the user to issue a command to place the mobile device 102 in the quiet mode. Additionally or alternatively, the notification may indicate that the control unit 104 is about to automatically place the mobile device 102 in the quiet mode. In these or other embodiments, the notification may allow the user to dismiss or override placing the mobile device 102 in the quiet mode. In addition, in some embodiments, the notification may allow the user to set a starting and ending time and/or a time period for which the mobile device 102 may be in the quiet mode. Further, in some embodiments, the control unit 104 may automatically place the mobile device 102 in the quiet mode during the specified activities without notifying the user or obtaining further instructions from the user. In these or other embodiments, when the specified activities are over as indicated in the corresponding activity information and/or when the time period or ending time have passed, the control unit 104 may automatically place the mobile device 102 into its previous mode before being placed into the quiet mode.

In some embodiments, the control unit 104 may be configured to modify the activity instructions based on user behavior. For example, the activity instructions may indicate that the mobile device 102 be placed in the quiet mode during activities of a particular type. However, the user may routinely override placing the mobile device 102 in the quiet mode during activities of the particular type. Accordingly, the control unit 104 may modify the activity instructions regarding the particular activity type such that the mobile device 102 may not be placed in the quiet mode during activities of the particular type based on the behavior of the user.

The user location data 118 may include information regarding one or more locations and/or location types and corresponding location instructions associated with locations that the user may visit. In some embodiments, the location instructions may be provided by the user of the mobile device 102 (e.g., via the user interface 110 and/or via another device that may sync with the mobile device 102). The location instructions may indicate that the user desires that the mobile device 102 be in the quiet mode when the mobile device 102 is at specified locations. In some embodiments, the location instructions may include general instructions for general location types. For example, the user may indicate that the mobile device 102 be in the quiet mode when the mobile device 102 is at a location type generally identified as a place of worship, an arena, an auditorium, a movie theatre, a theatre house, a restaurant, a stadium, a library, a bookstore, and/or a performance venue.

Figure 2:
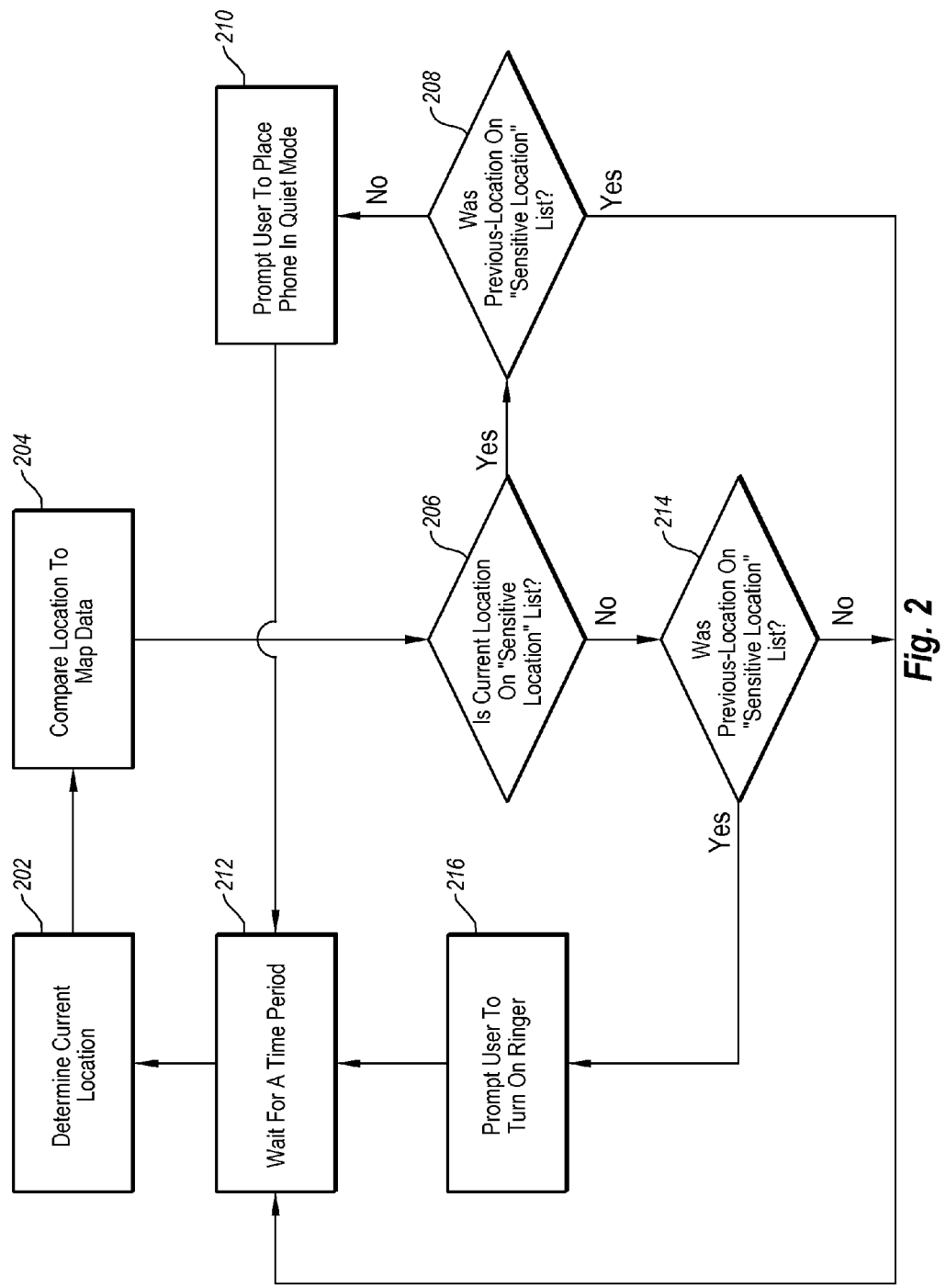
FIG. 2 is a flowchart of an example method that may be used to place a mobile device in a quiet mode based on user location data.

In these or other embodiments, the location instructions may include specific instructions that are tied to a specific location. For example, via the user interface 110 and a function provided on an application installed on the mobile device 102, the user may select the specific location on a map and may indicate a desire that the mobile device 102 be in the quiet mode when the mobile device 102 is at the specific location. Additionally or alternatively, when the user is at the specific location, the application may allow the user to make a selection indicating a desire that the mobile device 102 be in quiet mode whenever the mobile device 102 is at the specific location. FIG. 2 described below illustrates a method 200 that may be performed by the control unit 104 to place the mobile device 102 in the quiet mode based on the user location data 118.

In some embodiments, the control unit 104 may be configured to modify the location instructions based on user behavior. For example, the location instructions may indicate that the mobile device 102 be placed in the quiet mode at a particular location based on the location type of the particular location and/or other specific instructions from the user regarding the particular location. However, the user may routinely override placing the mobile device 102 in the quiet mode at the particular location. Accordingly, the control unit 104 may modify the location instructions regarding the particular location such that the mobile device 102 may not be placed in the quiet mode at the particular location based on the behavior of the user.

The third-party location data 120 may be obtained by the control unit 104 via a communication from a third-party to the mobile device 102. The third-party location data 120 may include external request instructions regarding a desire by the third party that the mobile device 102 be in the quiet mode when the mobile device 102 is at a location managed by the third party. The location managed by the third party may be referred to as the "third-party location." By way of example, the third-party location may include a place of worship, an arena, an auditorium, a movie theatre, a theatre house, a restaurant, a stadium, a library, a bookstore, and/or a performance venue.

When the third party knows that the mobile device 102 is at the third-party location or should be at the third-party location, the third party may communicate to the mobile device 102 (e.g., in third-party location data 120) external request instructions that the mobile device 102 be in the quiet mode while at the third-party location. Based on the external request instructions, the control unit 104 may automatically place the mobile device 102 in the quiet mode without notifying the user or obtaining further instructions from the user. Additionally or alternatively, the control unit 104 may notify the user that the control unit 104 is about to automatically place the mobile device 102 in the quiet mode. In these or other embodiments, the notification may allow the user to dismiss or override placing the mobile device 102 in the quiet mode. In addition, in some embodiments, the notification may allow the user to set a starting and ending time and/or a time period for which the mobile device 102 may be in the quiet mode.

For example, a user may acquire tickets for a performance or a movie, or may make reservations to a restaurant. During the ticket acquisition or reservation process, the user may provide a contact identifier (e.g., a phone number) associated with the mobile device 102. When the time for the performance, movie, or restaurant reservation occurs, the applicable third party may send, e.g., as external request instructions, a message (e.g., a text message) to the mobile device 102 indicating that the mobile device 102 should be placed in the quiet mode. In some embodiments, the control unit 104 (e.g., via an application stored in the memory 108) may be configured to automatically place the mobile device 102 in the quiet mode upon receiving the message.

As another example, when the mobile device 102 connects to a network (e.g., a wireless network) managed by the third party, the third party may include (e.g., as external request instructions) instructions that may be received by the control unit 104 that the mobile device 102 be placed in the quiet mode. The control unit 104 may then notify the user to issue a command to place the mobile device 102 in the quiet mode based on the received instructions. Additionally or alternatively, the control unit 104 may notify the user that the control unit 104 is about to automatically place the mobile device 102 in the quiet mode. In these or other embodiments, the notification may allow the user to dismiss or override placing the mobile device 102 in the quiet mode. In other embodiments, the control unit 104 may automatically place the mobile device 102 in the quiet mode without notifying the user or obtaining further instructions from the user. In addition, in some embodiments, the notification may allow the user to set a starting and ending time and/or a time period for which the mobile device 102 may be in the quiet mode.

Further, in some embodiments, when the mobile device 102 is no longer at the third-party location, the control unit 104 may automatically place the mobile device 102 in a non-quiet mode or provide a notification to the user to issue a command to place the mobile device 102 in the non-quiet mode. For example, in some embodiments, when the mobile device 102 disconnects from the third-party network, the control unit 104 may automatically place the mobile device 102 in the non-quiet mode or may notify the user to issue the command to place the mobile device 102 in the non-quiet mode.

Accordingly, the mobile device 102 may be configured to provide user notifications to place the mobile device 102 in quiet mode and/or to automatically place itself in quiet mode based on the user's location and/or activities. Modifications, additions, or omissions may be made to the mobile device 102 without departing from the scope of the present disclosure.

FIG. 2 is a flowchart of an example method 200 that may be used to place a mobile device in a quiet mode based on user location data, according to at least one embodiment described herein. The method 200 may be implemented, in some embodiments, by a control unit of a mobile device, such as the control unit 104 of the mobile device 102 of FIG. 1A. Although illustrated as including discrete blocks, various blocks of the method 200 may be divided into additional blocks, combined into fewer blocks, or eliminated, depending on the desired implementation.

The method 200 may include a block 202 where a current location of the mobile device may be determined. The current location may be determined based on GPS data, communication of the mobile device with an access point of a wireless communication network, and/or location information that may be included in calendar data, in some embodiments. At block 204, the current location may be compared with map data.

At block 206, it may be determined whether the current location is on a "sensitive location" list, which may be included in user location data. For example, locations that are on the "sensitive location" list may include locations that are of a particular location type of which the user has indicated that the mobile device be placed in the quiet mode while at the particular location type. In these or other embodiments, locations that are on the "sensitive location" list may include specific locations of which the user has indicated that the mobile device be placed in the quiet mode while at the specific locations. The map and current location data may indicate specific coordinates and/or a location type of the current location. As such, the specific coordinates and/or the location type may then be compared with the user location data to determine whether the current location is a "sensitive" location. When the current location is a "sensitive" location, the method 200 may proceed from block 206 to block 208. When the current location is not a "sensitive" location, the method 200 may proceed from block 206 to block 214.

At block 208, it may be determined whether a previous location (e.g., the location determined prior to determining the current location) was on the "sensitive location" list. When the previous location was on the "sensitive location" list, the method 200 may proceed to block 212. When the previous location was not on the "sensitive location" list, the method 200 may proceed to block 210.

At block 210, a notification may be generated that may prompt the user to issue a command that may place the mobile device in the quiet mode based on the current location being a "sensitive" location. Additionally or alternatively, the notification may indicate that the mobile device is about to automatically place itself in the quiet mode. In these or other embodiments, the notification may allow the user to dismiss or override placing the mobile device in the quiet mode. Further, in some embodiments, the mobile device may automatically place itself in the quiet mode without notifying the user or obtaining further instructions from the user. In addition, in some embodiments, the notification may allow the user to set a starting and ending time and/or a time period for which the mobile device may be in the quiet mode.

At block 212, a wait may be performed for a time period. For example, a wait of between 2 and 3 minutes may be performed at block 212. Following block 212, the method 200 may return to block 202 to determine the current location again. Therefore, if the mobile device has moved during the time period associated with the wait, the current location may be different from the location determined before the time period. The wait may allow for the current location to be updated every so often while also preserving battery and/or processing power by not constantly checking and updating the current location.

As mentioned above, when the current location is not a "sensitive" location at block 206, the method 200 may proceed from block 206 to block 214. At block 214, it may be determined whether the previous location (e.g., the location determined prior to determining the current location) was on the "sensitive location" list. When the previous location was on the "sensitive location" list, the method 200 may proceed to block 216. When the previous location was not on the "sensitive location" list, the method 200 may proceed to block 212.

At block 216, a notification may be generated that may prompt the user to issue a command to place the mobile device in a non-quiet mode (e.g., to turn on the ringer) based on the current location not being a "sensitive" location and based on the previous location being a "sensitive" location. Additionally or alternatively, the notification may indicate that the mobile device is about to automatically place the mobile device in the non-quiet mode or in the mode that it was in before it was at the "sensitive" location. In these or other embodiments, the notification may allow the user to dismiss or override placing the mobile device in the non-quiet mode. Further, in some embodiments, the mobile device may automatically place itself in the non-quiet mode without notifying the user or obtaining further instructions from the user. Therefore, the user may be notified to place the mobile device in a non-quiet mode or the mobile device may be automatically placed in the non-quiet mode in response to the mobile device leaving a "sensitive" location. Following block 216, the method 200 may proceed to block 212.

Accordingly, the method 200 may be used to place a mobile device in and out of a quiet mode based on user location data of the mobile device. One skilled in the art will appreciate that the functions performed in the method 200 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

Figure 3:
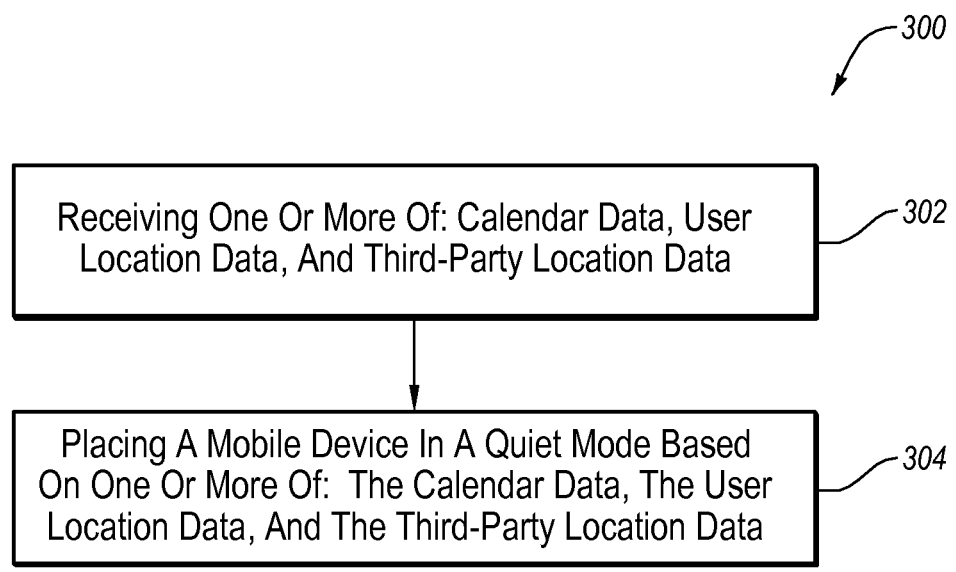
FIG. 3 is a flowchart of an example method that may be used to place a mobile device in a quiet mode

FIG. 3 is a flowchart of an example method 300 that may be used to place a mobile device in a quiet mode, according to at least one embodiment described herein. The method 300 may be implemented, in some embodiments, by a control unit of a mobile device, such as the control unit 104 of the mobile device 102 of FIG. 1A. Although illustrated as including discrete blocks, various blocks of the method 300 may be divided into additional blocks, combined into fewer blocks, or eliminated, depending on the desired implementation.

The method 300 may begin at block 302 where one or more of calendar data, user location data and third-party location data may be received. As detailed above, the calendar data may include activity instructions from a user of a mobile device. Further, the activity instructions may indicate that the mobile device be in a quiet mode during a particular activity included in the calendar data. In addition, the user location data may include user location instructions from the user of the mobile device. The user location instructions may indicate that the mobile device be in the quiet mode when the mobile device is at a particular location based on the particular location being of a particular location type. Moreover, as detailed above, the third-party location data may include external request instructions from a third party where the external request instructions may indicate that the mobile device be in the quiet mode when the mobile device is at a third-party location.

At block 304, the mobile device may be placed in the quiet mode based on one or more of the calendar data, the user location data and the third-party location data during the particular activity and/or when the mobile device is at the particular location or the third-party location. In particular, the mobile device may be placed in the quiet mode based on one or more of the activity instructions, the user location instructions, and the third-party instructions.

Accordingly, the method 300 may be used to place a mobile device in a quiet mode based on activities and/or locations of a user of the mobile device. One skilled in the art will appreciate that the functions performed in the method 300 may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

For example, in some instances, the method 300 may include receiving the third-party location data as a text message or in response to the mobile device connecting to a wireless network managed by the third-party. Further, the method 300 may include determining a current location of the mobile device based on one or more of Global Positioning System (GPS) data, communication of the mobile device with an access point of a wireless communication network, and location information included in the calendar data. In these or other embodiments, the method 300 may include determining whether the current location is of the particular location type and placing the mobile device in the quiet mode when it is determined that the current location is of the particular location type.

In addition, in some embodiments, the method 300 may include automatically placing the mobile device in a non-quiet mode in response to the particular activity being over as indicated in the calendar data. Also, the method 300 may include automatically placing the mobile device in the non-quiet mode in response to the mobile device leaving the particular location type. In these or other embodiments, the method 300 may include automatically placing the mobile device in the non-quiet mode in response to the mobile device leaving the third-party location. In some embodiments, the method 300 may include automatically placing the mobile device in the quiet mode without waiting for any further commands from the user to do so.

In addition, in some embodiments, the method 300 may include prompting the user to issue a command to place the mobile device in the quiet mode based on one or more of the activity instructions, the user location instructions and the external request instructions. The method 300 may also include placing the mobile device in the quiet mode in response to the user issuing the command. Further, in some embodiments, the method 300 may include modifying the user location instructions based on user behavior, such as described above.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method comprising:
   receiving one or more of the following:
   calendar data including activity instructions that indicate that a mobile device be in a quiet mode during a particular activity included in the calendar data, the activity instructions being from a user of the mobile device; and
   user location data including user location instructions that indicate that the mobile device be in the quiet mode when the mobile device is at a particular location based on the particular location being of a particular location type, the user location instructions being from the user of the mobile device;

performing one or more of the following:

during the particular activity, placing the mobile device in the quiet mode based on the activity instructions included in the calendar data; and in response to the mobile device being at the particular location, placing the mobile device in the quiet mode based on the user location instructions included in the user location data; and modifying, based on a pattern of the user overriding placing the mobile device in the quiet mode, one or more of the following: the user location instructions and the activity instructions.

2. The method of claim 1, wherein the particular location includes one or more of the following: a place of worship, an arena, an auditorium, a movie theatre, a theatre house, a restaurant, a stadium, a library, a book store, and a performance venue.

3. The method of claim 1, further comprising:

determining a current location of the mobile device based on one or more of the following: Global Positioning System (GPS) data, communication of the mobile device with an access point of a wireless communication network, and location information included in the calendar data;

determining whether the current location is of the particular location type; and placing the mobile device in the quiet mode when it is determined that the current location is of the particular location type.

4. The method of claim 1, further comprising performing one or more of the following:

automatically placing the mobile device in a non-quiet mode when the particular activity has ended as indicated in the calendar data; and automatically placing the mobile device in the non-quiet mode when the mobile device leaves the particular location.

5. The method of claim 1, wherein the activity instructions indicate that the mobile device be in the quiet mode during the particular activity based on the particular activity being of an activity type of which the user has specified that the mobile device be in the quiet mode.

6. The method of claim 1, further comprising:

prompting the user to issue a command to place the mobile device in the quiet mode based on one or more of the following: the activity instructions and the user location instructions; and placing the mobile device in the quiet mode in response to the user issuing the command.

7. The method of claim 1, further comprising automatically placing the mobile device in the quiet mode based on one or more of the following: the activity instructions and the user location instructions without waiting for any further commands from the user to do so.

8. Non-transitory computer-readable storage media including computer executable instructions configured to cause a system to perform operations, the operations comprising:

receiving one or more of the following:

calendar data including activity instructions that indicate that a mobile device be in a quiet mode during a particular activity included in the calendar data, the activity instructions being from a user of the mobile device; and user location data including user location instructions that indicate that the mobile device be in the quiet mode when the mobile device is at a particular location based on the particular location being of a particular location type, the user location instructions being from the user of the mobile device;

performing one or more of the following:

during the particular activity, placing the mobile device in the quiet mode based on the activity instructions included in the calendar data; and in response to the mobile device being at the particular location, placing the mobile device in the quiet mode based on the user location instructions included in the user location data; and modifying, based on a pattern of the user overriding placing the mobile device in the quiet mode, one or more of the following: the user location instructions and the activity instructions.

9. The non-transitory computer-readable storage media of claim 8, wherein the particular location includes one or more of the following: a place of worship, an arena, an auditorium, a movie theatre, a theatre house, a restaurant, a stadium, a library, a book store, and a performance venue.

10. The non-transitory computer-readable storage media of claim 8, wherein the operations further comprise:

determining a current location of the mobile device based on one or more of the following: Global Positioning System (GPS) data, communication of the mobile device with an access point of a wireless communication network, and location information included in the calendar data;

determining whether the current location is of the particular location type; and placing the mobile device in the quiet mode when it is determined that the current location is of the particular location type.

11. The non-transitory computer-readable storage media of claim 8, wherein the operations further comprise performing one or more of the following:

automatically placing the mobile device in a non-quiet mode when the particular activity has ended as indicated in the calendar data; and automatically placing the mobile device in the non-quiet mode when the mobile device leaves the particular location.

12. The non-transitory computer-readable storage media of claim 8, wherein the activity instructions indicate that the mobile device be in the quiet mode during the particular activity based on the particular activity being of an activity type of which the user has specified that the mobile device be in the quiet mode.

13. The non-transitory computer-readable storage media of claim 8, wherein the operations further comprise:

prompting the user to issue a command to place the mobile device in the quiet mode based on one or more of the following: the activity instructions and the user location instructions; and placing the mobile device in the quiet mode in response to the user issuing the command.

14. The non-transitory computer-readable storage media of claim 8, wherein the operations further comprise automatically placing the mobile device in the quiet mode based on one or more of the following: the activity instructions and the user location instructions without waiting for any further commands from the user to do so.

15. A method comprising:
- receiving calendar data including activity instructions that indicate that a mobile device be in a quiet mode during a particular activity included in the calendar data, the activity instructions being from a user of the mobile device;
- during the particular activity, placing the mobile device in the quiet mode based on the activity instructions included in the calendar data; and
- modifying the activity instructions based on a pattern of the user overriding placing the mobile device in the quiet mode.

16. The method of claim 15, further comprising modifying the activity instructions for an activity type based on the pattern of the user overriding placing the mobile device in the quiet mode with respect to the activity type.

17. The method of claim 15, wherein the activity instructions indicate that the mobile device be in the quiet mode during the particular activity based on the particular activity being of an activity type of which the user has specified that the mobile device be in the quiet mode.

18. The method of claim 15, wherein the calendar data further includes an identifier for the mobile device and a quiet mode indication associated with the identifier and wherein the method further comprises placing the mobile device in the quiet mode based on the identifier of the mobile device in the calendar data and the quiet mode indication associated with the identifier.

* * * * *